United States Patent [19]

Vitous

[11] 3,975,996
[45] Aug. 24, 1976

[54] COFFEE BREWER APPARATUS

[75] Inventor: Charles J. Vitous, Berwyn, Ill.

[73] Assignee: Cory Food Services, Inc., Chicago, Ill.

[22] Filed: Jan. 22, 1975

[21] Appl. No.: 543,241

[52] U.S. Cl. .................................. 99/295; 99/303; 99/304
[51] Int. Cl.² .......................................... A47J 31/00
[58] Field of Search ............. 99/304, 279, 283–284, 99/287, 292, 293, 295, 300, 303, 305–306, 307–308, 309–310, 311–312

[56] References Cited
UNITED STATES PATENTS

| | | | |
|---|---|---|---|
| 2,558,521 | 6/1951 | Karlen | 99/303 |
| 3,209,676 | 10/1965 | Zimmermann et al. | 99/295 X |
| 3,450,024 | 6/1969 | Martin | 99/295 |
| 3,561,349 | 2/1971 | Endo et al. | 99/295 X |
| 3,620,155 | 11/1971 | Bixby, Jr. | 99/295 |
| 3,771,431 | 11/1973 | Ehrenberg, Jr. | 99/295 |
| 3,793,935 | 2/1974 | Martin | 99/295 |
| R27,959 | 4/1974 | Alexander, Jr. et al. | 99/295 |

Primary Examiner—Billy J. Wilhite
Assistant Examiner—Arthur O. Henderson
Attorney, Agent, or Firm—Wegner, Stellman, McCord, Wiles & Wood

[57] ABSTRACT

Coffee brewer apparatus adapted for the selective brewing in a brewing cartridge of coffee from ground coffee charges either in loose form carried on a cup-shaped filter sheet, or in enclosed form carried in a filter bag. The brewer apparatus includes selectively mountable hot water delivery elements and an adaptor selectively disposable in the cartridge for use in combination with the delivery element adapted for brewing coffee with bagged charges. The brewing cartridge is selectively positionable on a mounting bracket. The mounting bracket may be retained to a support wall portion of the brewer by the selectively mounted water delivery element.

16 Claims, 3 Drawing Figures

COFFEE BREWER APPARATUS

BACKGROUND OF THE INVENTION

1. Field of the Invention

This invention relates to coffee brewers and in particular to "drip" type coffee brewers wherein coffee is brewed by the flow of hot water downwardly through a charge of ground coffee carried in a cartridge having a lower coffee delivery outlet.

2. Description of the Prior Art

In one conventional form of coffee brewing apparatus, a cartridge is mounted subjacent a spray head which sprays hot water onto ground coffee carried on a suitable filter paper sheet in the cartridge. As the hot water flows downwardly through the ground coffee, the coffee beverage is brewed and flows downwardly through the filter sheet through a lower outlet in the cartridge to a subjacent container such as a decanter.

In a different form of brewing apparatus, such as shown in U.S. Pat. No. 3,771,431 of Milton F. Ehrenberg, Jr., owned by the assignee hereof, coffee is brewed by means of a bagged charge of ground coffee disposed in a brewing chamber in contact with a hot water delivery element. The brewed coffee flows upwardly from the brewing chamber through a filter and thence outwardly through a spout into a subjacent decanter or the like.

SUMMARY OF THE INVENTION

It has been found desirable to provide a universal coffee brewer which is adapted for use in brewing coffee both from loose ground coffee and from bagged ground coffee. The present invention comprehends such coffee brewer apparatus wherein the same cartridge may be utilized for either coffee brewing operation with the simple substitution of different water delivery elements preselected for effecting the desired optimum wetting of the ground coffee and with the use of an adaptor selectively mounted in the cartridge when brewing with bagged coffee.

More specifically, the invention comprehends such a coffee brewer apparatus wherein the different delivery elements are selectively secured to a connector portion of the hot water supply extending downwardly from a support wall. Synergistically, the delivery elements serve to retain a cartridge supporting bracket to the support wall in cooperation with suitable screws or the like.

To effect the desired optimum positioning of the cartridge relative to the hot water delivery element, the cartridge and support bracket are provided with cooperating means for selectively positioning the cartridge at different elevations. Thus, where the coffee is to be brewed by means of a bagged charge, the cartridge may be supported in a lower position for accommodating, in the cartridge, an adaptor which may be provided with upstanding handle portions. A suitable filter member may be movably mounted on the delivery element and biased outwardly by suitable means to cooperate with the adaptor in preventing undesirable passage of ground coffee from the brewing chamber such as in the event of a rupture of the charge bag.

Where the brewing operation utilizes a spray head distributing the hot water from the connector laterally throughout the cartridge, the adaptor is omitted and the ground coffee is carried in a conventional manner on a cup-shaped filter sheet resting directly on the lower ribbed portion of the cartridge. In this arrangement, the cartridge is supported by the bracket in an upper position closely subjacent the spray head. The cartridge is readily removably installed on the bracket for facilitated replacement of the coffee charge in either of the arrangements for improved facilitated coffee brewing.

Thus, the present invention permits selectively effecting the brewing of coffee by alternative methods with simple substitution of different suitable water delivery elements and adaptor means.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
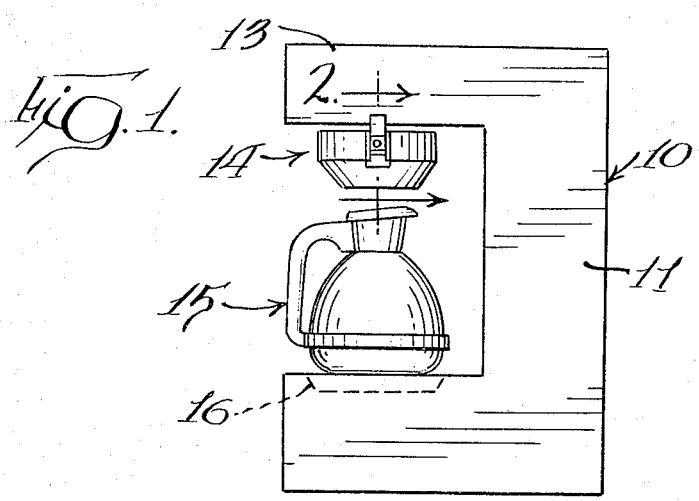
FIG. 1 is a side elevation of a coffee brewer apparatus embodying the invention.

In the exemplary embodiment of the invention as disclosed in the drawing, a brewing apparatus generally designated 10 is shown to comprise a cabinet 11 housing suitable automatically controlled apparatus (not shown) for delivering hot water through a supply conduit 12 (FIG. 2) downwardly from an upper portion 13 of the cabinet into brewing cartridge generally designated 14 for brewing coffee therein and delivering the brewed coffee to a subjacent decanter generally designated 15. Conventionally, a warming plate 16 may be provided subjacent the decanter for keeping the brewed coffee at a desired hot temperature.

The present invention is directed to the provision of means for permitting selective brewing of coffee in cartridge 14 either by means of a bagged charge of ground coffee generally designated 17, or a loose charge of ground coffee generally designated 18 carried on a cup-shaped filter sheet 19. The cartridge defines a bowl portion 20 having a lower central outlet 21 for delivering the brewed coffee downwardly into the decanter 15 with either method of brewing.

Figure 2:
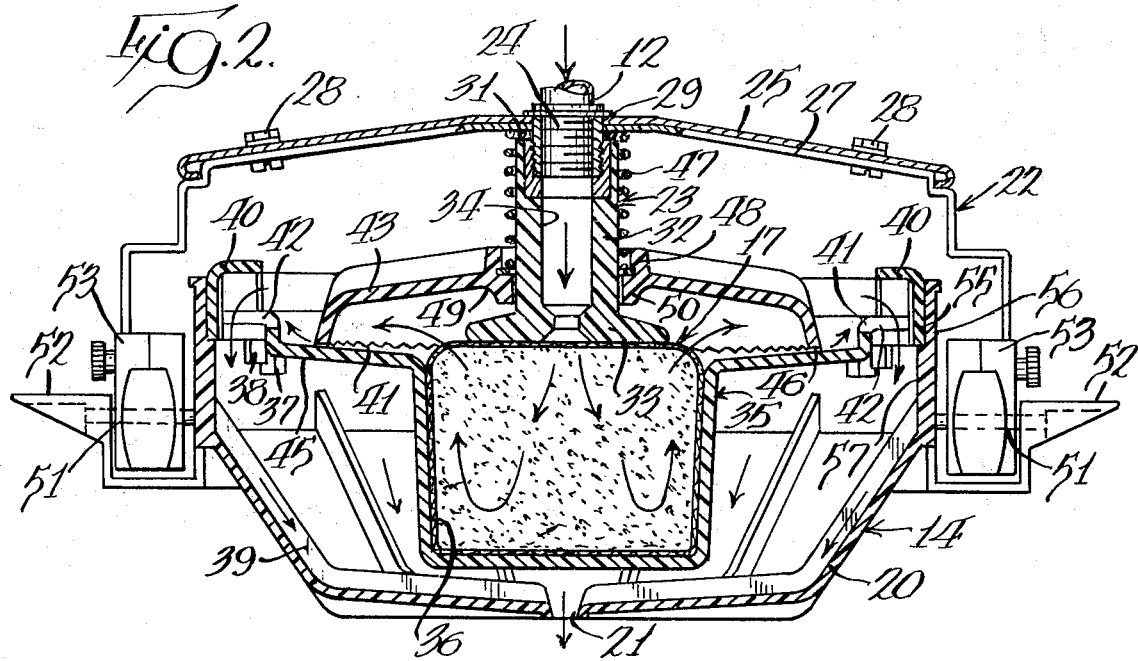
FIG. 2 is a fragmentary vertical section taken substantially along the line 2—2 of FIG. 1 illustrating the use of the apparatus in brewing coffee from a bagged ground coffee charge.
Figure 3:
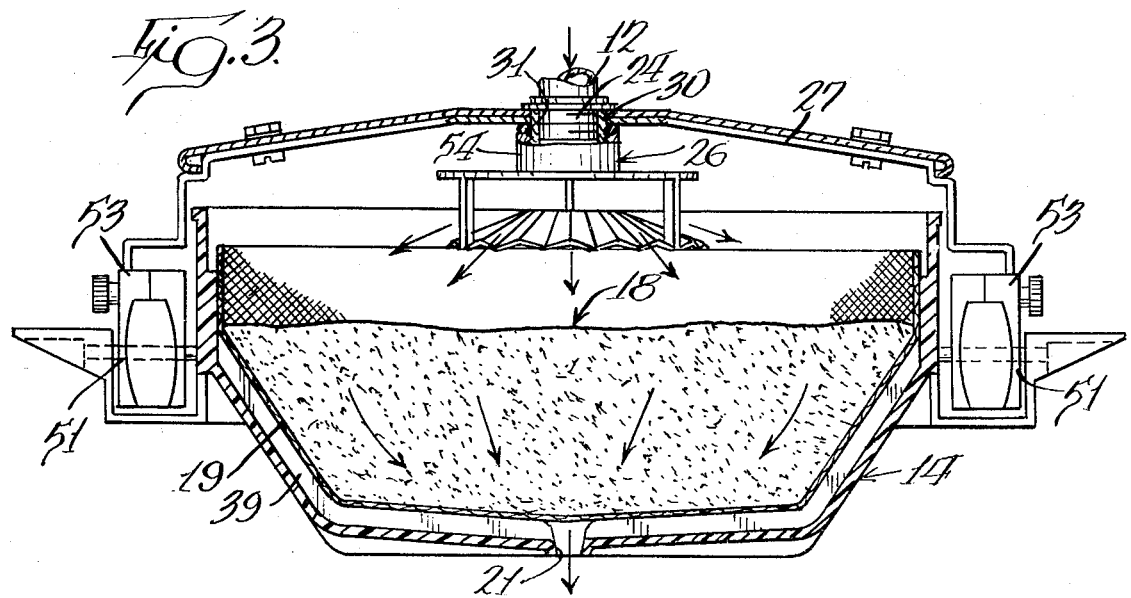
FIG. 3 is a fragmentary vertical section illustrating an alternative arrangement of the apparatus for use in brewing coffee from a loose ground coffee charge carried on a cup-shaped filter sheet resting in the cartridge.

Further, the invention comprehends providing a support bracket generally designated 22 which selectively positions the cartridge 14 in a first, lower position, as shown in FIG. 2, or in a second, upper position, as shown in FIG. 3, for optimum brewing of the coffee with the bagged charge method of FIG. 2 or the loose charge method of FIG. 3, respectively.

In brewing the coffee with the bagged charge 17, the apparatus is selectively arranged to include a mushroom head type delivery element 23 carried on a connector portion 24 at the lower end of the delivery conduit 12 extending through a support wall 25 of the cabinet 11. Where the coffee is brewed by means of the loose charge 18, as shown in FIG. 3, the hot water is delivered through a spray head generally designated 26 alternatively removably connected to the connector 24.

More specifically, bracket 22 includes an upper bight portion 27 underlying support wall 25 and retained thereagainst by means of suitable securing elements 28 and the delivery elements 23 and 26 mounted to the connector 25. Delivery element 23 is provided with a metal tubular bushing 29, and delivery element 26 is provided with a similar tubular metal bushing 30, internally threaded for threaded engagement with the externally threaded connector 24 for releasably securing the delivery elements selectively to the connector with a suitable O-ring 31 disposed between the bracket bight 27 and the upper end of the delivery element.

Delivery element 23 includes a relatively long upper tubular portion 32 and a lower radially enlarged head portion 33 with a through bore 34 extending through portions 32 and 33 for conducting the hot water downwardly from conduit 12 in a stream into the subjacent bag 17 as shown in FIG. 2. The bag is urged upwardly against the delivery element head 33 by an adaptor 35 having a well portion 36 receiving the bag 17 with the upper portion of the bag extending upwardly therefrom as shown in FIG. 2. The adaptor includes spring catch portions 37 releasably engaged with corresponding latch portions 38 on cartridge 14 to retain the well 36 slightly about a plurality of upstanding ribs 39 on the bowl portion 20 of the cartridge. The adaptor is further provided with a pair of upstanding handle portions 40 for use in installing and removing the adaptor relative to the cartridge. The handle portions upstand from an outturned annular peripheral flange 41 of the adaptor provided with a plurality of openings 42. The openings permit the flow of coffee downwardly through to the lower portion of the cartridge bowl for flow under the adaptor and downwardly through outlet 21 as shown. The handle portions include outer slide portions 55 slidably received in guide slots 56 in the side wall 57 of the cartridge for assuring alignment of spring catches 37 with latches 38 during installation of the adaptor in the cartridge.

Brewed coffee passes from the bagged charge 17 upwardly from well 36 and laterally outwardly to openings 42 under a filter frame 43 having a serrated lower edge 44 resting on an outturned apron 45 of the adaptor extending laterally from well portion 36. The brewed coffee flows through the openings 46 defined by serrated edge 44 of the filter and the upper surface of the apron 45 to the openings 42, as shown in FIG. 2, with the openings 46 being of preselected small size so as to prevent passage of any loose ground cofee which might pass from the bagged charge 17 such as in the event of a tear or rupture of the bag.

Filter frame 43 is urged downwardly to engage edge 44 with apron 45 by means of a biasing spring 47 which, in the illustrated embodiment, comprises a helical spring compressed between bracket bight 27 and an undercut spring retainer portion 48 of filter frame 43.

To prevent pinching of the bag 17 between the filter frame 43 and the outer portion of the mushroom head 33, a spacer 50 is provided on the filter frame. As shown in FIG. 2, the spacer may comprise an integral downturned extension on the radially inner portion of the filter frame.

Thus, when it is desired to brew coffee in apparatus 10 by means of prebagged charges 17, the adaptor 35 is installed in cartridge 14 with the adaptor portion 37 resting on the cartridge portions 38 in the position shown in FIG. 2. The cartridge is then installed on bracket 22 in the lower position upon suitably engaging male connectors, or pins, 51 on handle portions 52 of the bracket suitably with female mounting means 53 at opposite ends of the bracket. As discussed above, spring 47 urges the filter frame 43 against the adaptor so that upon delivery of hot water from conduit 12 into bag 17, coffee is brewed therein and the brewed coffee allowed to flow outwardly through the openings 46 and 42 to the cartridge outlet 21 for delivery to the subjacent decanter.

As shown in FIG. 3, the coffee brewing apparatus may be selectively utilized to brew the coffee by means of loose ground coffee 18 carried on the cup-shaped filter sheet 19 directly in the cartridge 14 with adaptor 35 removed. Thus, as shown in FIG. 3, the filter sheet rests directly on ribs 39.

Water is delivered onto the ground coffee 18 from the delivery conduit 12 through delivery element 26 comprising a distributor for delivering the water in a uniform distribution over substantially the entire transverse area of the cartridge so as to uniformly wet the ground coffee and obtain optimum brewing. Any suitable form of spray or deflector-type distributor may be utilized within the scope of the invention; in the illustrated invention, the delivery device 26 comprises an improved deflector-type spray head wherein the hot water is delivered in a plurality of distributed small streams as indicated. The spray head 26 includes a mounting portion 54 carrying the tubular bushing 30 with the O-ring 31 being disposed between the upper end of the mounting portion 54 and bracket bight 27.

As shown in FIG. 3, when the brewing apparatus is utilized for brewing with loose ground coffee, the cartridge may be mounted in an upper portion on bracket bight 27 by suitable engagement of pins 51 with the mounting portions 53 selectively in the upper disposition. Thus, the cartridge is disposed in the upper position closely subjacent the spray head for an improved brewing operation.

In loose charge brewing, the filter sheet 19 is firstly placed in the cartridge and the loose ground coffee 18 is placed onto the filter sheet. The cartridge is then installed on the bracket means 53 in the brewing apparatus 10 and upon delivery of hot water from conduit 12 through spray head 26, optimum brewing of the desired coffee beverage is effected in cartridge 14 and delivered through outlet 21 to the subjacent decanter 15, as illustrated in FIG. 1.

Mounting means 53 may be arranged to support pins 51 in a plurality of different elevations to accommodate different volume bagged charges, as well as to provide an upper support for the cartridge when brewing with loose charges.

The present invention permits selective brewing either with loose ground coffee or bagged ground coffee with the water delivery means being readily substitutable and with the cartridge being readily adapted for accommodating the bagged ground coffee by means of the simple insertion of adaptor 35.

The brewing apparatus of the present invention is extremely simple and economical of construction while yet providing the highly desirable features discussed above.

The foregoing disclosure of specific embodiments is illustrative of the broad inventive concepts comprehended by the invention.

I claim:

1. In a coffee brewer having a cabinet defining a support wall, a brewing cartridge having a receiver portion defining an upwardly open brewing chamber adapted to receive a sheet filter for supporting loose beverage ingredient and means for mounting the cartridge removably to said support wall, said cartridge having a bottom outlet, and hot water supply means extending through said support wall and having a portion adapted selectively to removably carry any one of a plurality of different hot water deliver elements for delivering hot water into said brewing chamber for contacting beverage ingredients therein, the improvement comprising: a water delivery element removably secured to said supply means portion and having a lower substantially flat surface provided with a through passage for conducting hot water from said supply means downwardly into said brewing chamber for brewing coffee therein; an adaptor removably received in said chamber and defining an inner brewing chamber substantially smaller than said cartridge brewing chamber for receiving a filter bag enclosing beverage ingredient subjacent said delivery element and defining a first filter; a filter member having a filter portion defining a second filter engaging said adaptor and a mounting portion movably carried by said water delivery element; and means releasably biasing said filter member to cause said filter portion to releasably bear against said adaptor in said cartridge whereby coffee beverage brewed within said bag is successively filtered by said bag and said second filter prior to delivery to said cartridge chamber and bottom outlet.

2. The coffee brewer improvement of claim 1 wherein said delivery element defines a cylindrical mounting portion, said filter member mounting portion being coaxially slidable thereon.

3. The coffee brewer improvement of claim 1 wherein said biasing means comprises a helical spring extending coaxially about said delivery element.

4. The coffee brewer improvement of claim 1 wherein said delivery element is threaded to said supply means subjacent said support wall.

5. The coffee brewer improvement of claim 1 wherein said delivery element includes a lower end portion preventing removal of said filter member when said delivery element is retained to said support wall.

6. The coffee brewer improvement of claim 1 wherein said adaptor includes upstanding handle means for manipulation thereof in installing and removing the adaptor relative to said cartridge.

7. In a coffee brewer having a cabinet defining a support wall, a brewing cartridge having a receiver portion defining an upwardly open brewing chamber adapted to receive a sheet filter for supporting loose beverage ingredient and means for mounting the cartridge removably to said support wall, said cartridge having a bottom outlet, and hot water supply means extending through said support wall and having a portion adapted selectively to removably carry any one of a plurality of different hot water delivery elements for delivering hot water into said brewing chamber for contacting beverage ingredients therein, the improvement comprising: a bracket connected to said support wall and having cartridge mounting means for selectively mounting the cartridge subjacent said supply means in a first, lower position for receiving water distributed outwardly and downwardly from said supply means and a second, raised position; a water delivery element removably secured to said supply means portion and having a lower substantially flat surface provided with a through passage for conducting hot water from said supply means downwardly into said brewing chamber for brewing coffee therein; an adaptor removably received in said chamber and defining an inner brewing chamber for retaining a filter bag enclosing beverage ingredient upwardly against said delivery element when the cartridge is supported by said bracket mounting means in said second position; a filter member overlying said adaptor defining a second filter; and means releasaby biasing said filter member downwardly against said adaptor in said cartridge whereby coffee beverage brewed within said bag is successively filtered by said bag and said second filter prior to delivery to said cartridge chamber and bottom outlet.

8. The coffee brewer improvement of claim 7 wherein said cartridge mounting means of said bracket comprises female means for receiving complementary male means on said cartridge.

9. The coffee brewer improvement of claim 7 wherein said second position is closely subjacent said support wall.

10. The coffee brewer improvement of claim 7 wherein said first position is preselected to dispose the top of said adaptor slightly below the level of the bottom of said delivery element.

11. The coffee brewer improvement of claim 7 wherein said delivery element locks said bracket to said support element.

12. The coffee brewer improvement of claim 7 wherein said delivery element is threaded to said supply means and releasably locks said bracket to said support element.

13. A coffe brewer apparatus comprising:
a cartridge;
hot water supply means defining a connector;
delivery means selectively removably mounted to said supply means connector for delivering hot water from said supply means comprising alternatively means for spraying hot water downwardly therefrom in a laterally spaced distribution, and means for delivering hot water downwardly therefrom in a single stream;
means for removably mounting said cartridge subjacent said delivery means mounted to said supply means for receiving hot water therefrom; and
adaptor means selectively removably mounted in said cartridge for holding a bag of beverage brewing ingredients in engagement with said single stream delivery means, said spraying means being arranged to distribute hot water throughout substantially the entire cross section of the cartridge with the adaptor means being omitted from the cartridge.

14. The coffee brewer apparatus of claim 13 wherein said spraying delivery means and said stream delivery means are selectively threadedly secured to said connector.

15. The coffee brewer apparatus of claim 13 wherein said cartridge mounting means is arranged to mount the cartridge in a lower position when the stream delivery means is used and in an upper position above said lower position when the spraying delivery means is used.

16. The coffee brewer apparatus of claim 13 wherein said delivery means locks the cartridge mounting means in position as an incident of mounting of the delivery means to the supply means connector.

* * * * *